Sept. 12, 1967  H. MANDEL  3,341,638
FOAMING OF POLYSTYRENE IN A HIGH FREQUENCY FIELD
Filed Sept. 14, 1965
2 Sheets-Sheet 1

INVENTOR
HELMUT MANDEL
BY
ATTORNEY.

Sept. 12, 1967  H. MANDEL  3,341,638
FOAMING OF POLYSTYRENE IN A HIGH FREQUENCY FIELD
Filed Sept. 14, 1965
2 Sheets-Sheet 2

INVENTOR
HELMUT MANDEL
BY
ATTORNEY.

United States Patent Office 3,341,638
Patented Sept. 12, 1967

3,341,638
FOAMING OF POLYSTYRENE IN A HIGH FREQUENCY FIELD
Helmut Mandel, Reibach uber Dieburg, Germany, assignor to Dorplastex A.G., Zug, Switzerland, a corporation of Switzerland
Filed Sept. 14, 1965, Ser. No. 487,244
3 Claims. (Cl. 264—25)

In the manufacture of composite board material, with foam polystyrene as core layer, and any paneling material, for example PVC panels, prior to foaming in the electric field of a high frequency generator, it is necessary to humidify the pre-foamed particles of polystyrene with a wetting agent or an electrolyte dissolved in water, for example salt, in order to make it conductive. This humidification is produced in a mixer by spraying the dissolved electrolyte by means of nozzles. The humidification can thus take place in mixers of the continuous or discontinuous type, such as those used in the chip board industry.

One of the objects of the invention is to humidify the pre-foamed particles with an electrolyte dissolved in water, after a planar form, for example a box form, has been filled with the particles and before the form is closed. This is to take place, immediately before foaming is effected between the electrodes of a high frequency generator.

More specifically, the pre-foamed particles, dispensed into the form, are humidified continuously by means of stationary or movable nozzles.

Humidification of thicker layers can be produced in the intervals between, or substantially simultaneously with the various spraying or dispensing steps of humidification.

These and other objects of the invention are more fully apparent from the drawings annexed herein in which FIG. 1 shows an arrangement embodying certain principles of the invention.

Figure 1:
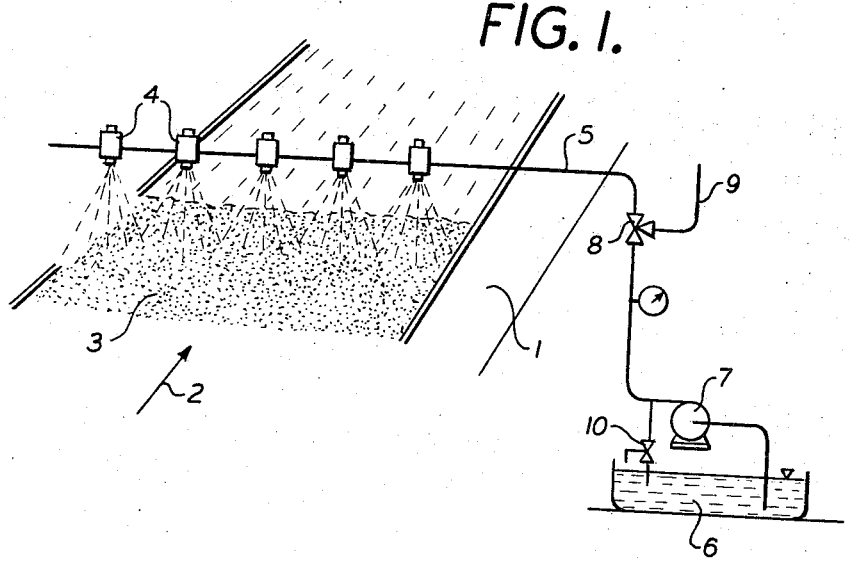

As shown in FIG. 1, box form 1 moving in direction 2 contains a layer 3 of prefoamed particles which are humidified by being passed under a number of nozzles 4 fed over line 5 from vessel 6. A pump 7 may be used to produce the necessary pressure, unless the liquid in vessel 6 is already under appropriate pressure. Three-way valve 7 may provide injection of an additive from line 8 to control the spraying process. Valve 10 represents another control device.

Figure 2:
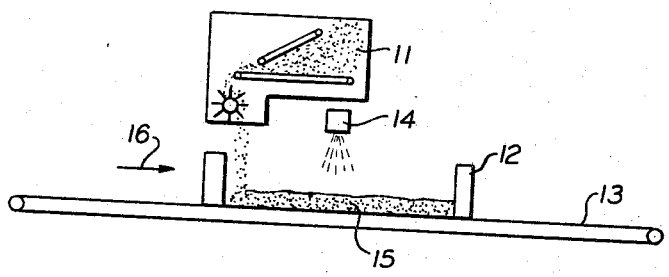
FIG. 2 illustrates an application of the invention to a single foam layer.

According to FIG. 2, pre-foamed polystyrene is applied by means of a spraying device or dispenser in a layer of approximately 4 mm. thickness, into a box form 12. The box form is moved beneath the dispenser with constant speed on belt 13. After dispensing the pre-foamed polystyrene, it is humidified by means of nozzle 14', the resulting foamable layer is indicated at 15.

Obviously, the speed of box form 1 can be kept constant or varied to adjust the thickness of layer 3 which also may be constant or vary throughout its length, or also from layer to layer.

Figure 3:
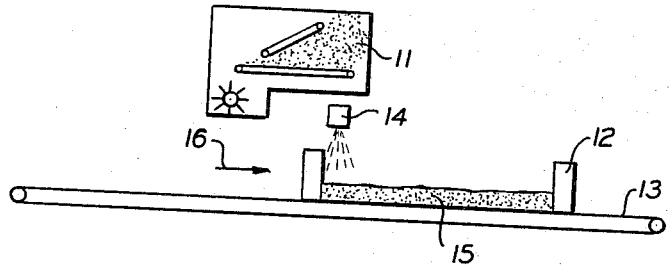
FIGS. 3, 4, 5 and 6 show the invention applied to a sequence of foam layers

According to FIG. 3, again, prefoamed polystyrene from dispenser 11, is sprayed into box form 12 into a layer 15 of say .4" thickness. After spraying, the pre-foamed polystyrene layer 15 is humidified by means of nozzle 14. At the same time, belt 13 moves box 12 with constant speed in direction 16 into the position shown in FIG. 4.

Figure 4:
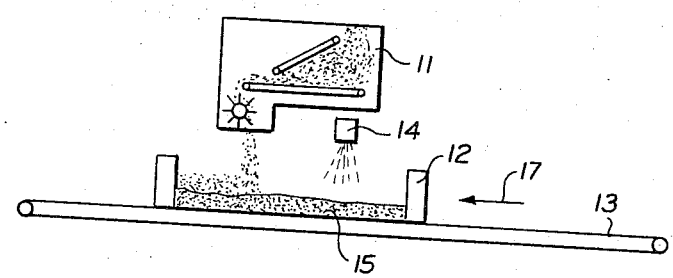
Figure 5:
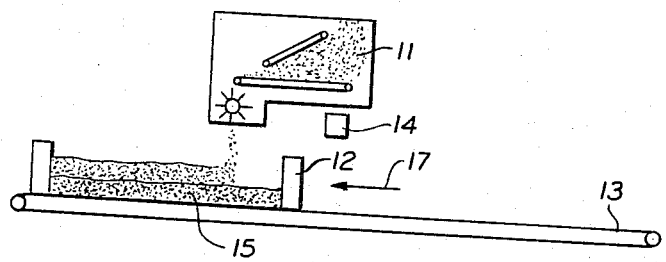

In a subsequent step, as shown in FIG. 4, belt 13 moves into the opposite direction indicated at 17, whereby an additional .4" pre-foamed polystyrene layer is produced, superimposed on layer 15. Here no humidification takes place, and we arrive at the position shown in FIG. 5.

Figure 6:
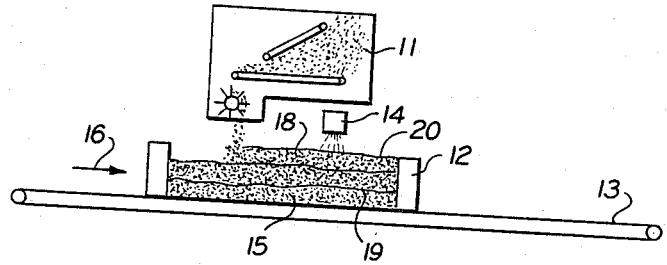

In another spraying operation, with box 15 again moving in direction 16, as shown in FIG. 6, another layer 18 is added and a total height of foamable material of say 1.2" is reached.

During this third spraying process, however, the material will be humidified by means of the nozzle 15. Thus, during these three spraying steps providing a thickness of .4" each, only the first and the last layers 15 and 18 are humidified as indicated in FIG. 6 at 19 and 20.

Figure 7:
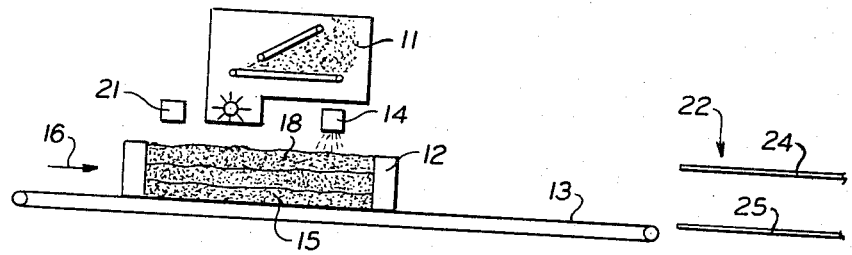
FIG. 7 represents a modification of the process illustrated in FIGS. 3, 4, 5 and 6.

In the modification of FIG. 7, the spraying steps are substantially the same or similar to those described with respect to FIGS. 3, 4, 5 and 6. However, by mounting a second nozzle, schematically indicated at 21, on the other side of nozzle 14, in principle, each layer can be humidified during each spraying step.

As apparent from FIG. 7 the box form 12 containing the several superimposed layers of foamable material, is moved by belt 13 immediately after humidification into the clamping or haltering device, schematically indicated at 22, and the plates 24 and 25 of which also form the electrodes of a dielectric heater, connected to a high frequency generator (not shown). In this way, the foaming is effected immediately after humidification.

In this case also, in order to prevent overheating, only one or more of the upper or outer layers of the foamable material need to be humidified.

Generally, humidification in accordance with the invention has the following features or advantages.

In the manufacture of composite boards or similar planar forms, for example doors, it is possible to dispense dry expanded polystyrene or Styropor (trademark) in one or several layers and humidify it after each dispensing process. With dry foamable polystyrene it is possible to produce a denser layer.

Pre-humidified pre-foamed polystyrene is not as easily dispensable and an additional pressing or stamping operation may become necessary.

With this type of humidification also a separate humidification or mixing step is eliminated, so that time and labor can be saved. Furthermore, humidification can take place in a more concentrated or better directed manner, i.e. in accordance with the width of the panel; the humidification areas can be kept smaller or larger as the case may be, so that material spilled over remains dry and can be refed into the dispenser.

As another feature of the invention, humidification becomes feasible in such a way that only the outer layers are wetted. This is of special advantage in high frequency foaming because it counteracts the fact that when material is well humidified (for example in mixers) the center layer in the high frequency field already melts in the high heat, while the border areas are not yet sufficiently welded together.

While the invention has been shown and described with certain arrangements and certain types of layers and spraying elements, it is not limited thereto, but may be applied in any form or manner whatsoever without departing from the scope of this disclosure.

I claim:

1. In a method of forming foamable polystyrene material into panels, the steps of continuously injecting said material by spreading it from the top onto a box form while said box form is moving forward and backward relative to the point of injection, so as to form a number of substantially continuous layers, one superimposed upon the other; humidifying at least some of said layers with dissolved electrotype during said spreading, and exposing said layers to a dielectric field immediately after spreading and humidification.

2. Method according to claim 1 comprising the step of humidifying only every other layer.

3. Method according to claim 1 comprising the step of humidifying at least one of the outer layers to increase strength at outer portions of the foam.

References Cited

UNITED STATES PATENTS

| | | | |
|---|---|---|---|
| 2,951,260 | 9/1960 | Harrison | 264—25 |
| 2,998,501 | 8/1961 | Edberg | 264—26 |
| 3,037,897 | 6/1962 | Pelley | 264—47 |
| 3,197,531 | 7/1965 | Wilbur | 264—88 |

OTHER REFERENCES

Plastics Engineering Handbook, 3rd edition, 1960, pages 181 and 180 relied upon.

ROBERT F. WHITE, *Primary Examiner.*

R. B. MOFFITT, *Assistant Examiner.*